United States Patent [19]

Abe et al.

[11] Patent Number: 5,023,286

[45] Date of Patent: Jun. 11, 1991

[54] POLYPROPYLENE RESIN COMPOSITIONS

[75] Inventors: Masaru Abe, Osaka; Yoichi Kawai; Masami Maki, both of Kanagawa; Katuo Wada, Kanagawa, all of Japan

[73] Assignee: Mitsui Toatsu Chemicals, Inc., Tokyo, Japan

[21] Appl. No.: 414,251

[22] Filed: Sep. 29, 1989

[30] Foreign Application Priority Data

Oct. 5, 1988 [JP] Japan .............................. 63-249850

[51] Int. Cl.$^5$ ........................... C08K 5/51; C08K 5/13
[52] U.S. Cl. .................................... 524/128; 524/583; 524/584; 524/430; 524/432; 524/427; 524/451; 524/423; 524/449; 524/340
[58] Field of Search .............. 524/128, 583, 584, 430, 524/432

[56] References Cited

U.S. PATENT DOCUMENTS 4,145,001 3/1979 Weyenberg et al. ................ 428/43

FOREIGN PATENT DOCUMENTS 62-86039 4/1987 Japan .
63-54935 3/1988 Japan .

*Primary Examiner*—Joseph L. Schofer
*Assistant Examiner*—Mark Sweet
*Attorney, Agent, or Firm*—Burns, Doane, Swecker & Mathis

[57] ABSTRACT

The present invention relates to polypropylene resin compositions that exhibit an improved smell over prior art polypropylene resin compositions and comprises a polypropylene resin containing an inorganic filler, at least one phenolic antioxidant, at least one phosphorus antioxidant, and fine powders comprising aggregates of intimately bonded particles comprising zinc oxide, titanium dioxide and water.

12 Claims, No Drawings

POLYPROPYLENE RESIN COMPOSITIONS

BACKGROUND OF THE INVENTION

The present invention relates to polypropylene resin compositions. More specifically, the invention relates to polypropylene resin compositions that do not emanate an odor upon heating.

DISCUSSION OF THE PRIOR ART

It has been known to incorporate an inorganic filler into polypropylene resins to improve the heat resistance, rigidity and dimensional stability of polypropylene resin compositions. Such polypropylene resin compositions have been widely employed in various industrial fields such as automobiles and light electric appliances as well as containers for foods. However, when used for producing containers for foods, particularly for foods that are to be heated in a microwave oven or the like, the odor generated during heating is offensive to the person heating the food. Therefore, it has been desired to develop resin compositions that do not emanate an offensive odor upon heating.

In an attempt to solve the above problems inorganic fillers have been examined with respect to their place of production, and methods of production have been developed to improve the smell of polypropylene resin compositions. However, such attempts have led to an increase in cost and do not achieve the goal of improving the smell. It has also been proposed to use a deodorizer such as active carbon or a deodorizer obtained by bonding L-ascorbic acid to iron sulfate. However, if active carbon is used, the color of the resultant resin composition is black and, therefore, its applications are severely limited. The deodorizer obtained by bonding iron sulfate and L-ascorbic acid achieves only a slight deodorizing effect. Thus, the foregoing problem cannot be satisfactorily eliminated by the use of such deodorizers.

Japanese Patent Laid-open Publication (hereinafter referred to as "J. P. KOKAI") No. 63-54935 discloses fine powders comprising aggregates of intimately bonded particles composed of zinc oxide, titanium dioxide and water, as a white deodorizer. This white fine powder absorbs odors originating from gases which produce a bad smell such as hydrogen sulfide, ammonia, mercaptans, amines or aldehydes. However, sufficient improvement in the smell of polypropylene resin compositions cannot be achieved even if the foregoing white fine powdery deodorizer is incorporated into the resin composition containing an inorganic filler as will be demonstrated in the Comparative Examples below.

SUMMARY OF THE INVENTION

The present invention overcomes the problems and disadvantages of the prior art by providing a polypropylene resin composition containing an inorganic filler that has a more desirable smell than prior art polypropylene resin compositions, particularly when heated.

It is an object of the present invention to provide a polypropylene resin composition containing an inorganic filler that exhibits a more desirable smell upon heating than prior art polypropylene resin compositions and that can be prepared in an economic and efficient manner.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention provides a polypropylene resin composition comprising:

1) about 100 parts by weight of a polypropylene resin containing an inorganic filler;
2) from about 0.01 to about 0.5 part by weight of at least one phenolic antioxidant;
3) from about 0.01 to about 0.5 part by weight of at least one phosphorus antioxidant; and
4) from about 0.01 to about 3.0 parts by weight of fine powders comprising aggregates of intimately bonded particles composed of zinc oxide, titanium dioxide and water.

DESCRIPTION OF THE PREFERRED EMBODIMENTS

Reference will now be made in detail to the present preferred embodiments of the invention.

Preferably the polypropylene resins employed in the invention are crystalline polypropylene resins. Exemplary suitable polypropylene resins for use in the invention include homopolymers of propylene, copolymers of propylene with alpha-olefins such as ethylene as well as mixtures of these polymers or copolymers with a homopolymer or copolymer of alpha-olefins except for propylene. The polypropylene resins may further comprise other thermoplastic elastomers.

Preferably, the phenolic antioxidants employed in the invention are monophenolic, bisphenolic and high molecular phenolic antioxidants. Exemplary suitable phenolic antioxidants include monophenolic antioxidants such as 2,6-di-t-butyl-p-cresol, butylated hydroxyanisole, 2,6-di-t-butyl-4-ethylphenol, stearyl-$\beta$-(3,5-di-t-butyl-4-hydroxyphenyl)-propionate; bisphenolic antioxidants such as 4,4'-butylidene-bis-(3-methyl-6-t-butylphenol) and 4,4'-thiobis(3-metyl-6-t-butylphenol); and polyphenolic antioxidants such as 1,1,3-tris-(2-methyl-5-hydroxy-5-t-butylphenyl)butane, 1,3,5-trimethyl-2,4,6-tris(3,5-di-t-butyl-4-hydroxybenzyl) benzene, tetrakis-(methylene-3-(3',5'-di-t-butyl-4'-hydroxyphenyl)-propionate)-methane, tocopherols and tris(3,5-di-t-butyl-4-hydroxybenzyl)-isocyanurate.

Exemplary suitable phosphorus antioxidants for use in the invention include tris(nonylphenyl) phosphite, distearyl pentaerythritol disphosphite, tris(2,4-di-t-butylphenyl) phosphite, 4,4'-butylidene-bis(3-methyl-6-t-butylphenyl) di-tridecyl phosphite, tetrakis(2,4-di-t-butylphenyl) 4,4'-biphenylene diphosphonate and cyclic neopentane tetraylbis(2,4-di-t-butylphenyl phosphite).

Exemplary suitable fine powders comprising aggregates of intimately bonded particles composed of zinc oxide, titanium dioxide and water used in the present invention include those disclosed in J. P. KOKAI No. 63-54935 as white deodorizers, which are manufactured and sold by TITAN INDUSTRIES CO., LTD. under the trade name of TZ-100. The foregoing white fine powders consisting of ZnO, TiO, and $H_2O$ can be prepared according to a method comprising combining, in portions or at a time, a mixed aqueous solution of a water-soluble titanium compound, for example, titanium sulfate, and a water-soluble zinc compound, for example, zinc sulfate, and an alkali aqueous solution, for example, aqueous ammonia so that the pH value of the solution of the mixture is from about 6 to about 11; forming a precipitate; separating the precipitate from the solution and then drying the precipitate. Preferably, the molar ratio of ZnO to $TiO_2$ is from about 1:9 to about 9:1, more preferably from about 3:7 to about 7:3. The J. P. KOKAI No. 63-54935 is hereby incorporated by reference.

Exemplary inorganic fillers suitable for use in the present invention include talc, calcium carbonate, barium sulfate, mica and calcium silicate as well as inorganic fillers usually incorporated into polypropylene resins. The filler may be used alone or in combination.

The inorganic fillers and the polypropylene resin are preferably employed in an amount of from about 1 to about 50% by weight and from about 99 to about 50% by weight, respectively, to achieve desired rigidity, impact resistance, heat resistance and moldability of the resulting resin composition.

Preferably, the phenolic antioxidant is employed in an amount of from about 0.01 to about 0.5 part by weight per 100 parts by weight of the polypropylene resin containing an inorganic filler. Applicants have found that if the phenolic antioxidant is employed in an amount less than about 0.01 part by weight, the resultant resin composition emanates an offensive odor. If the amount of phenolic antioxidant exceeds 0.5 part by weight, the resulting resin composition becomes expensive and the antioxidant sometimes emanates an offensive odor.

Preferably, the phosphorus antioxidant to be incorporated into the resin composition is employed in an amount of from about 0.01 to about 0.5 part by weight per 100 parts by weight of the polypropylene resin containing inorganic fillers. If employed in an amount less than about 0.01 part by weight, the resultant resin composition emanates an offensive odor. If employed in an amount exceeding about 0.5 part by weight, the resulting resin composition becomes expensive and the antioxidant per se sometimes emanates an offensive odor.

The fine powders comprising aggregates of intimately bonded particles composed of zinc oxide, titanium dioxide and water are preferably employed in the invention in an amount of from about 0.01 to about 3.0 parts by weight per 100 parts by weight of the polypropylene resin containing inorganic fillers. Applicants have found that employed in an amount less than about 0.01 part by weight, the smell of the resulting resin composition is not sufficiently improved, and if employed in an amount exceeding about 3 parts by weight, further improvement in the smell is not expected and the resulting resin composition becomes expensive.

The resin composition of the present invention may contain at least one additive which is usually incorporated into the polypropylene resin, such as an antistatic agent such as a glycerin and higher alcohol antistatic agent; nucleating agent such as metal salts of benzoic acid; ultraviolet absorbers such as benzotriazole, salicylate, and benzophenone absorbers; ultraviolet stabilizers such as hindered amine stabilizers; and heat stabilizers such as sulfur stabilizers; as well as organic and inorganic pigments, provided that the additive does not impair the properties of the polypropylene resin compositions of the present invention.

Metal salts of higher fatty acids such as calcium stearate may be added to polypropylene resins as a scavenger for hydrochloric acid generated from the residue of polymerization catalysts. Preferably, a composite metal hydroxide type compound such as hydrotalcite is substituted for a part or whole of the metal salt of higher fatty acid to provide an improved fragrance.

The composition of the present invention can be prepared by premixing the aforementioned ingredients in a mixer such as a Henshel type mixer, melting and kneading the components in an extruder, such as a single screw extruder or a twin-screw extruder to pelletize the mixture. It is preferable to add the aggregates of intimately bonded particles composed of zinc oxide, titanium dioxide and water during preparation of the inorganic filler or by mixing the aggregates of intimately bonded particles and the inorganic filler prior to blending these ingredients.

The pellets obtained can be formed into a desired product by various molding methods such as, for example, extrusion molding, injection molding, rotational molding and compression molding.

The polypropylene resin compositions of the present invention have greatly improved fragrance compared to prior art polypropylene resin compositions, particularly when heated. The polypropylene resin compositions of the invention are useful in numerous applications, including as containers for foods.

The present invention will be further clarified by the following examples, which are intended to be purely exemplary of the invention. In the following Examples and Comparative Examples, the determination and evaluation of the smell of the composition were performed according to the following methods.

Wet Evaluation

An injection-molded product obtained by a method described below was cut into pieces of about 1 cm square. 22.5 g of the pieces were placed in a 300 cc Erlenmeyer flask. 225 cc of pure water were poured into the flask and the flask was sealed with aluminum foil. The water was boiled for 2 hours in a hot water bath, and the pieces were then withdrawn from the flask and the smell thereof examined and evaluated by the following evaluation standard.

Evaluation Standard:
: giving out almost no smell;
: slightly giving out smell;
Δ: giving out smell in some extent;
x: considerably giving out smell: and
x x : giving out smell in a very great extent.

Dry Evaluation

This evaluation test was carried out in the same manner as that for the wet evaluation except that pure water was not used.

EXAMPLE 1

70 parts by weight of a polypropylene homopolymer (hereunder referred to as "PP-A") having a melt flow index (MI) at 230 of 4.0 g/10 min and boiling n-heptane-insoluble matters of 96.5% by weight, 30 parts by weight of talc having an average particle size (D50) of 3.8 microns, 0.02 part by weight calcium stearate, 0.05 part by weight hydrotalcite, 0.1 part by weight tetrakis(methylene-3-(3',5'-di-t-butyl-4'-hydroxyphenyl)-propionate)methane, 0.05 part by weight tetrakis(2,4-di-t-butylphenyl) 4,4'-biphenylene diphosphinate and 0.05 part by weight TZ-100 (available from TITAN INDUSTRIES, CO., LTD. as mentioned hereinbefore) as the aggregates of intimately bonded particles composed of zinc oxide, titanium dioxide and water were mixed in a Henshel mixer. The mixture was pelletized at 230 utilizing a single screw extruder having a diameter of 40 mm. The pellets were formed into a plate having a size of 80×160×2 mm at 230° C. using an 100 ton injection molder. The aforementioned evaluation was performed on the injection molded samples. The results obtained are summarized in Table I.

EXAMPLES 2 TO 12

The same procedures used in Example I were repeated to form samples except that the types and amounts of additives such as antioxidants were changed as set forth in Table I. The smell of these samples was examined and evaluated. The results observed are set forth in Table I.

COMPARATIVE EXAMPLES 1 TO 6

The same procedures used in Example 1 were repeated except that the types and amounts of the additives such as antioxidants were changed as listed in Table II. The smell of the comparative samples was examined and evaluated. The results observed are listed in the Table II.

EXAMPLE 13

The same procedures used in Example 2 were repeated except that ethylene-propylene block copolymer (hereunder referred to as "PP-B") having an ethylene content of 6.5% by weight, boiling n-heptane-insoluble matters of 93.8% by weight and an MI of 8 g/10 min was substituted for the PP-A used in Example 2. The results observed are set forth in Table I.

EXAMPLE 14

The same procedures used in Example 2 were repeated except that heavy calcium carbonate having an average particle size (D50) of 1.1 micron was substituted for talc used in Example 2 and the results obtained were listed in Table I.

EXAMPLE 15

The same procedures used in Example 2 were repeated except that the amounts of PP-A and talc were changed to those listed in Table I. The results observed are set forth in Table I.

In the foregoing Examples and Comparative Examples, the antioxidants employed were as follows.

Phenolic Antioxidants

A: Tetrakis(methylene-3-(3',5'-di-t-butyl-4'-hydroxyphenyl)-propionate)methane;
B: Stearyl-β-(3,5-di-t-butyl-4-hydroxyphenyl)propionate;
C: 1,3,5,-trimethyl-2,4,6-tris(3,5-di-t-butyl-4-hydroxybenzyl)-benzene;
D: Tris(3,5-di-t-butyl-4-hydroxybenzyl)isocyanurate;

Phosphorus Antioxidants

E: Tetrakis(2,4-di-t-butylphenyl)4,4'-biphenylenediphosphinate;
F: Tris(2,4-di-t-butylphenyl)phosphite;
G: Distearyl pentaerythritol diphosphite.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

TABLE I

| | (part by weight) Ex. No. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| PP-A | 70 | 70 | 70 | 70 | 70 | 70 | 70 | 70 | 70 | 70 | 70 | 70 | | 70 | 55 |
| PP-B | | | | | | | | | | | | | 70 | | |
| Talc | 30 | 30 | 30 | 30 | 30 | 30 | 30 | 30 | 30 | 30 | 30 | 30 | 30 | | 45 |
| Calcium carbonate | | | | | | | | | | | | | | 30 | |
| Phenolic antioxidant | | | | | | | | | | | | | | | |
| A | 0.1 | 0.1 | 0.1 | 0.05 | 0.3 | | | | 0.1 | 0.1 | 0.1 | 0.1 | 0.1 | 0.1 | 0.1 |
| B | | | | | | 0.1 | | | | | | | | | |
| C | | | | | | | 0.1 | | | | | | | | |
| D | | | | | | | | 0.1 | | | | | | | |
| Phosphorus antioxidant | | | | | | | | | | | | | | | |
| E | 0.05 | 0.05 | 0.05 | 0.05 | 0.05 | 0.05 | 0.05 | 0.05 | 0.03 | 0.1 | | | 0.05 | 0.05 | 0.05 |
| F | | | | | | | | | | | 0.1 | | | | |
| G | | | | | | | | | | | | 0.1 | | | |
| TZ-100 | 0.05 | 0.2 | 3.0 | 0.2 | 0.2 | 0.2 | 0.2 | 0.2 | 0.2 | 0.2 | 0.2 | 0.2 | 0.2 | 0.2 | 0.2 |
| Results of smell evaluation | | | | | | | | | | | | | | | |
| Wet | | | | | | | | | | | | | | | |
| Dry | | | | | | | | | | | | | | | |

Other additives:
Calcium stearate 0.02 (part by weight)
Hydrotalcite 0.05 (part by weight)

TABLE II

| | Comp. Ex. No | | | | | |
|---|---|---|---|---|---|---|
| | 1 | 2 | 3 | 4 | 5 | 6 |
| PP-A | 70 | 70 | 70 | 70 | 70 | 70 |
| Talc | 30 | 30 | 30 | 30 | 30 | 30 |
| Phenolic antioxidant A | 0.1 | 0.1 | 0.1 | 0.1 | 0 | 0.005 |
| Phosphorus antioxidant E | 0.05 | 0.05 | 0 | 0.005 | 0.05 | 0.05 |
| TZ-100 | 0 | 0.005 | 0.2 | 0.2 | 0.2 | 0.2 |
| Results of smell | | | | | | |

TABLE II-continued

| | Comp. Ex. No | | | | | |
|---|---|---|---|---|---|---|
| | 1 | 2 | 3 | 4 | 5 | 6 |
| evaluation | | | | | | |
| Wet | XX | X | X | Δ | X | Δ |
| Dry | XX | X | X | Δ | X | X |

Other additives:
Calcium stearate 0.02 (part by weight)
Hydrotalcite 0.05 (part by weight)

What is claimed is:

1. A polypropylene resin composition comprising
   1) about 100 parts by weight of a polypropylene resin containing an inorganic filler;
   2) from about 0.01 to about 0.5 part by weight of at least one phenolic antioxidant;
   3) from about 0.01 to about 0.5 part by weight of at least one phosphorus antioxidant; and
   4) from about 0.01 to about 3.0 parts by weight of fine powders comprising aggregates of intimately bonded particles comprising zinc oxide, titanium dioxide and water.

2. The polypropylene resin composition of claim 1 wherein the inorganic filler is present in an amount of from about 1 to about 50% by weight based on the total weight of said polyproylene resin and said inorganic filler and the polypropylene resin is present in an amount of from about 99 to about 50% by weight based on the total weight of said polypropylene resin and said inorganic filler.

3. The polypropylene resin composition of claim 1 wherein the molar ratio of zinc oxide to titanium dioxide in said fine powders comprising aggregates of intimately bonded particles is from about 1:9 to about 9:1.

4. The polypropylene resin composition of claim 3 wherein the molar ratio of zinc oxide to titanium dioxide is from about 3:7 to about 7:3.

5. The polypropylene resin composition of claim 1 wherein said polypropylene resin is crystalline.

6. The polypropylene resin composition of claim 1 wherein said at least one phenolic antioxidant is selected from the group consisting of monophenolic antioxidants and bisphenolic antioxidants.

7. The polypropylene resin composition of claim 1 wherein said phosphorus antioxidant is selected from the group consisting of tris(nonylphenyl)phosphite, distearyl pentaerythritol disphosphite, tris(2,4-di-t-butylphenyl)phosphite, 4,4'-butylidene-bis(3-methyl-6-t-butylphenyl)ditridecyl phosphite, tetrakis(2,4-di-t-butylphenyl)4,4'-biphenylene diphosphonate and cyclic neopentane tetraylbis-(2,4-di-t-butylphenyl phosphite).

8. The polypropylene resin composition of claim 1 wherein said inorganic filler is at least one compound selected from the group consisting of talc, calcium carbonate, barium sulfate, mica and calcium silicate.

9. The polypropylene resin composition of claim 1 wherein said phenolic antioxidant is present in an amount of from about 0.1 to about 0.5 part by weight per 100 parts by weight of said polypropylene resin containing an inorganic filler.

10. The polypropylene resin composition of claim 1 wherein said phosphorus antioxidant is present in an amount of from about 0.01 to about 0.5 part by weight per 100 parts by weight of said polypropylene resin containing an inorganic filler.

11. The polypropylene resin composition of claim 1 wherein said fine powders are present an amount of from about 0.01 to about 3.0 parts by weight per 100 parts by weight of said polypropylene resin containing an inorganic filler.

12. The polypropylene resin composition of claim 1 further comprising an additive.

* * * * *

UNITED STATES PATENT AND TRADEMARK OFFICE
CERTIFICATE OF CORRECTION

PATENT NO. : 5,023,286

DATED : June 11, 1991

INVENTOR(S) : Abe et al.

It is certified that error appears in the above-identified patent and that said Letters Patent is hereby corrected as shown below:

In column 7, line 30, amend "polyroylene" to --polypropylene--.

Signed and Sealed this

Sixth Day of April, 1993

Attest:

STEPHEN G. KUNIN

*Attesting Officer*   *Acting Commissioner of Patents and Trademarks*